United States Patent Office 2,774,748
Patented Dec. 18, 1956

2,774,748

COMPOSITION CONTAINING GLYCIDYL POLYETHER OF A POLYHYDRIC PHENOL AND A METHYLOL SUBSTITUTED 2 - ALKENYLOXYBENZENE

Harry W. Howard, South Orange, and Clifford V. Wittenwyler, Roselle, N. J., assignors to Shell Development Company, Emeryville, Calif., a corporation of Delaware No Drawing. Application April 14, 1952,
Serial No. 282,274

10 Claims. (Cl. 260—45.5)

This invention relates to a new composition of matter capable of being cured with the aid of acidic curing agents to a resinous product which is particularly adapted as a protective surface coating material owing to its outstanding resistance against action of solvents and corrosive liquids.

The composition of the invention comprises a mixture of glycidyl polyether of a polyhydric phenol having a 1,2-epoxy equivalency greater than 1.0, and a 2-alkenyloxybenzene having 1 to 3 methylol groups which are linked singly at the 2, 4 and 6 positions on the benzene ring. A particular embodiment of the invention is the composition comprising glycidyl polyether of a dihydric phenol having a 1,2-epoxy equivalency between 1.0 and 2.0 in admixture with a minor proportion (less than 50% by weight) of allyloxybenzene having 3 methylol groups which are linked singly at the 2, 4 and 6 positions on the benzene ring. An especially suitable embodiment of the invention is the composition containing glycidyl polyether of 2,2-bis(4-hydroxyphenyl)propane in uniform combination with a mixture of allyloxybenzenes having 1 to 3 methylol groups which are linked singly at the 2, 4 and 6 positions on the benzene ring, which mixture contains a major proportion of the allyloxybenzene having 3-methylol groups linked to the benzene ring.

The glycidyl polyethers of polyhydric phenols are obtainable by reacting a polyhydric phenol with epichlorhydrin in basic medium at about 50° C. to 150° C. with use of more than one mol of epichlorhydrin per equivalent of phenolic hydroxyl group of the phenol and a slight stoichiometric excess of base such as about 2% to 30% excess sodium or potassium hydroxide. The reaction is effected by heating for several hours and the product is then separated from formed salt, excess base, and any unreacted epichlorhydrin. It is usually preferred to employ glycidyl polyether of a dihydric phenol in the invention, which product, instead of being a single simple compound, is generally a complex mixture of glycidyl polyethers, but the principal product may be represented by the formula

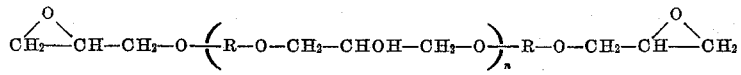

wherein n is an integer of the series 0, 1, 2, 3 . . . , and R represents the divalent hydrocarbon radical of the dihydric phenol. While for any single molecule of the polyether n is an integer, the fact that the obtained polyether is a mixture of compounds causes the determined value for n, e. g., from molecular weight measurement, to be an average which is not necessarily zero or a whole number. Although the polyether is a substance primarily of the above formula, it may contain some material with one or both of the terminal glycidyl radicals in hydrated form, and therefore, the 1,2-epoxy equivalency approaches, but is not equal to 2.0; it is a value between 1.0 and 2.0.

The simplest of the polyethers is the diglycidyl diether of a dihydric phenol. It contains a single divalent aromatic hydrocarbon radical from the dihydric phenol and has two glycidyl radicals linked thereto by ethereal oxygen atoms. More generally, the polyether of dihydric phenols is of more complex character and contains two or more aromatic hydrocarbon radicals alternating with glyceryl groups in a chain which are linked together by intervening ethereal oxygen atoms.

The 1,2-epoxy equivalency of the glycidyl polyether refers to the number of 1,2-epoxy groups

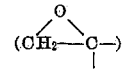

contained in the average molecule of the polyether. The 1,2-epoxy equivalency is thus dependent upon the molecular weight and the epoxide value which is measured as gram equivalents of epoxide per 100 grams of polyether. The 1,2-epoxide value is determined by heating a weighed sample of polyether with an excess of 0.2 N pyridinium chloride in chloroform solution at the boiling point under reflux for two hours whereby the pyridinium chloride hydrochlorinates the epoxy groups to chlorhydrin groups. After cooling, the excess unreacted pyridinium chloride is back-titrated with 0.1 N sodium hydroxide in methanol to the phenolphthalein end point. The epoxide value is calculated by considering one HCl as equivalent to one epoxide group. This method is used for obtaining all epoxide values discussed herein.

Any of the various polyhydric phenols is used in preparing the polyesters employed in the invention including mononuclear phenols such as resorcinol, catechol, hydroquinone, methyl resorcinol, etc.; or polynuclear phenols like 2,2-bis(4-hydroxyphenyl)propane which is termed bis-phenol herein for convenience, 4,4'-dihydroxybenzophenone, bis(4-hydroxyphenyl)methane, 1,1-bis(4-hydroxyphenyl)ethane, 1,1-bis(4-hydroxyphenyl)isobutane, 2,2-bis(4-hydroxyphenyl)butane, 2,2 - bis(4-hydroxy-2-methylphenyl)propane, 2,2-bis(4-hydroxy-2-tertiarybutylphenyl)propane, 2,2-bis(2-hydroxynaphthyl)pentane, 1,5-dihydroxynaphthalene, etc., as well as more complex polyhydric phenols such as pyrogallol, phloroglucinol and novolac resins from condensation of a phenol with an aldehyde in the presence of an acidic condensation catalyst. Preparation of glycidyl polyether of novolac resin is described in Example 27 of German Patent No. 676,117.

Particularly preferred polyethers used in the invention are prepared from 2,2-bis(4-hydroxyphenyl)propane. They contain a chain of alternating glyceryl and 2,2-bis(4-hydroxyphenylene)propane radicals separated by intervening ethereal oxygen atoms and have a 1,2-epoxy equivalency between 1.0 and 2.0. Very suitable glycidyl polyethers of 2,2-bis(4-hydroxyphenyl)propane have a molecular weight of about 1200 to 4000 as is the case when n is about 3 to 13 in the above-described structural formula.

The glycidyl polyethers will be better understood from consideration of the following described preparations and the properties of the products. The parts are by weight.

POLYETHER A

In a vessel fitted with an agitator, 228 parts (1 mol) of bis-phenol and 55 parts (1.37 mols) of sodium hydroxide as a 10% aqueous solution are introduced and heated to about 45° C. whereupon 113 parts (1.22 mols) of epichlorhydrin are added rapidly while agitating the mixture. The temperature of the mixture is then gradually increased and maintained at about 95° C. for 80 minutes. The mixture separates into a two-phase system and the aqueous layer is drawn off from the taffy-like product which forms. The latter is washed with hot water while molten until the wash water is neutral to litmus. The product is then drained and dried by heating to a final temperature of about 130° C. The resulting glycidyl polyether of 2,2-bis(4-hydroxyphenyl)propane has a Durrans' Mercury Method softening point of 98° C. and an epoxide value of 0.11 epoxy equivalent per 100 grams. The molecular weight measured ebullioscopically in ethylene dichloride is 1400. The 1,2-epoxy equivalency is 1.5. The product will be identified hereinafter as Polyether A.

POLYETHER B

Glycidyl polyethers of higher molecular weight are most easily prepared by heating together and reacting a lower polyether with additional dihydric phenol. Thus 100 parts of Polyether A are melted by heating to 150° C., and then 5 parts of bis-phenol are added. The heating is continued for about two hours while stirring the reaction mass and gradually increasing the temperature to about 200° C. The resulting glycidyl polyether has a Durrans' softening point of 131° C., a molecular weight of 2900, an epoxide value of 0.05 epoxy equivalents per 100 grams, and a 1,2-epoxy equivalency of 1.5.

POLYETHER C

This polyether is prepared as described for Polyether B except that 100 parts of Polyether A are mixed, heated and reacted with 7.75 parts of bis-phenol. The resulting product has a Durrans' softening point of 146° C., a molecular weight of 3750, an epoxide value of 0.036 epoxy equivalent per 100 grams, and a 1,2-epoxy equivalency of 1.4.

The 2-alkenyloxy benzene containing 1 to 3 methylol groups as substituents on the benzene ring that is employed in admixture with the glycidyl polyether in the compositions of the invention include a variety of particular compounds. The 2-alkenyl radical in the compound has an olefinic double bond between the beta and gamma carbon atoms, the saturated alpha carbon atom being linked to the ether oxygen atom. Among typical 2-alkenyl radicals contained in the compounds are allyl, methallyl, crotyl, 2-pentenyl, 2-methyl-2-butenyl, 3-methyl-2-butenyl, 2-hexenyl or like groups. If desired, the 2-alkenyl radical may contain one or more halogen substituents as is the case with 2-chloroallyl, 3-chloroallyl, 2-bromoallyl, 2-chloro-2-methylallyl, 2,3-dichloroallyl, and like groups. It is preferred to employ a compound containing three methylol groups linked to the benzene ring, but other compounds containing only one or two methylol groups linked singly at any one of the 2, 4 and 6 positions are also suitable. Although substantially pure compounds can be used in practicing the invention, it is more usual that a mixture of the 2-alkenyloxy compounds be contained in the composition. This is because production of the compounds, which is effected in known manner, normally gives a mixture which is equally suitable. The produced mixture normally contains a 2-alkenyloxybenzene having three methylol groups linked singly at the 2, 4 and 6 positions on the benzene ring in admixture with a minor proportion of 2-alkenyloxybenzenes having one to two methylol groups linked singly at the 2, 4 and 6 positions of the benzene ring. Normally the 2-alkenyl radicals in the mixture of compounds are the same for each. Especially suitable compounds of the class, whether used singly or as mixtures, are those wherein the 2-alkenyl radical is the allyl group. Reference is made particularly to allyloxy-2,4,6-tri(hydroxymethyl)benzene.

The compositions of the invention are prepared by bringing the methylol-substituted 2-alkenyloxybenzene into uniform admixture with the glycidyl polyether. Most of the methylol-substituted 2-alkenyloxybenzenes preferred for use are liquid at ordinary temperature of about 20° C. When the glycidyl polyether is also liquid at normal temperature, the compositions are easily prepared by stirring the two components together. The glycidyl polyethers, even in solid form, dissolve in the methylol-substituted 2-alkenyloxy compounds and the compositions are thus obtainable by mixing and dissolving solid glycidyl polyether in the liquid second component. Application of heat to one or both components assists in obtaining homogeneous mixture thereof. One or both of the components are heated to fluidizing temperature such as up to about 175° C. and mixing is effected.

Since one of the principal uses of the composition is as a surface coating material in cured condition and application to a surface is usually effected with a solution of the composition, it is convenient to prepare the composition with use of mutual solvents. Various normally liquid organic compounds are suitable for this purpose including ketones such as methyl ethyl ketone, methyl isobutyl ketone, mesityl oxide, cyclohexanone, isophorone, etc.; ethers and ether-esters of glycols such as monomethyl, monoethyl and monobutyl ether of ethylene glycol, diethylene glycol, and propylene glycol and the corresponding acetates and propionates; halogenated hydrocarbons such as ethylene dichloride, trichloropropane, etc. Instead of using only active solvents, it is more customary to utilize a mixture of one or more active solvents with one or diluents. For this purpose, aromatic hydrocarbons are suitable such as benzene, toluene, xylene, etc. Alcohols such as ethanol, butanol and methyl isobutyl carbinol are also useful constituents of the solvent mixture. In using solutions of the composition of the invention for surface coating purposes, solutions of suitable spraying or brushing viscosity are employed that contain about 20% to 60% of the composition.

The compositions of the invention contain various proportions of the two essential components thereof, the particular proportion being governed primarily by the use of the composition. Thus, while the weight ratio of the two components can vary, for example, from about 9:1 to 1:9, it is customary in surface coating applications to employ compositions containing a minor proportion of the 2-alkenyloxy compound. Excellent results have been obtained with compositions containing about 20% to 45% by weight of the 2-alkenyloxy compounds.

The compositions of the invention are cured to hard tough resinous material by application of heat in the presence of acidic curing agents. Among suitable curing agents are phosphoric acid, butyl dihydrogen phosphate, oxalic acid, p-toluenesulfonic acid and benzene disulfonic acid. Although various amounts of the acidic substances can be used to effect cure, about an added 0.2% to 5% by weight of the composition is ordinarily employed. It has been found that phosphoric acid is particularly effective for curing the composition, especially when about an added 1% to 2% is used.

The compositions containing the acidic curing agent undergo cure by heating at about 250° F. to 450° F. The time needed for complete cure will vary inversely with the temperature. Thus, while 60 minutes time may be needed at 300° F., only 10 minutes are required at 400° F. In general, heating is continued until cure is complete as evidenced by development of insolubility of the product in methyl ethyl ketone, which is an active solvent for the uncured composition.

The chemical reactions which occur during the curing are extremely complex and are not fully understood. The epoxide groups of the glycidyl polyether may couple with the hydroxyl groups also in the polyether, with the hydroxyl groups of the 2-alkenyloxy compound and/or with the acid curing agent. The 2-alkenyl groups of the methylol-substituted benzene also appear to enter into the reactions in some way since corresponding resistance against corrosive liquids and solvents as well as toughness and flexibility is not obtained with like use of corresponding alkyloxybenzene compounds.

In using the composition of the invention, various other substances can be incorporated therewith besides solvents and curing agents. Reference is made to incorporation of such materials as pigments, other resins, plasticizers, fillers and dyes.

It has been found useful, as described and claimed in application Serial No. 432,028, filed May 24, 1954 jointly by applicants herein and one Otho L. Nikles, Jr., now Patent No. 2,713,565, to include about 0.2% to 3%, preferably about 0.5% to 2% of a polyvinyl acetal resin with compositions employed for surface coating purposes. The compositions applied as solutions to surfaces have some tendency to "crawl" which is formation of regions of different thickness of film. Although various polyvinyl acetal resins are suitable for overcoming the crawling of the films, it is preferred to employ polyvinyl acetal resins of saturated aldehydes (alkanals) of 2 to 4 carbon atoms, of which polyvinyl butyral resin has been found preferable.

While various auxiliary materials may be employed in combination as adjuvants with the composition, the use of these added substances is not indispensable. A basic embodiment of the invention is thus a composition consisting essentially of a glycidyl polyether of a polyhydric phenol having a 1,2-epoxy equivalency greater than 1.0 in admixture with at least one compound of the class consisting of 2-alkenyloxybenzenes having 1 to 3 methylol groups which are linked singly at the 2, 4 and 6 positions on the benzene rings.

The following examples are given for the purpose of illustrating several specific embodiments of the invention which are not to be construed as limited to particular details described therein. The parts are by weight.

*Example 1*

A coating composition was prepared from Polyether B and a mixture of allyloxy-2,4,6-tri(hydroxymethyl)benzene containing a minor proportion of allyloxybenzenes having one and two methylol groups linked singly at the 2, 4 and 6 positions on the benzene ring. For convenience, this viscous liquid mixture of the methylol-substituted allyloxybenzenes will be termed AOB in this and subsequent examples.

The coating composition contained 75 parts of Polyether B, 25 parts of AOB, and 1.5 parts of phosphoric acid dissolved in about 300 parts of solvent consisting of equal parts of toluene and Cellosolve acetate (the acetate of monoethyl ether of ethylene glycol). Two cured films were prepared by flowing the composition on tin-plated sheet steel panels, allowing the solvent to evaporate briefly and baking one panel for 20 minutes and the other for 60 minutes in an air oven at 375° F. Both cured films were unaffected by contact for 5 minutes with methyl ethyl ketone. Films lacking in solvent resistance dissolve or soften when contacted with methyl ethyl ketone. The cured films were also unaffected when subjected to impact with the Gardner Impact Tester set at 28-inch pounds.

*Example 2*

To further test the solvent resistance of cured compositions of the invention, a coating composition containing 60 parts of Polyether B, 40 parts of AOB and 1.5 parts of phosphoric acid dissolved in about 300 parts of equal weights of Cellosolve acetate and toluene was prepared, flowed on tin plate panels, and cured by baking for 20 minutes in an air oven at 400° F. The cured film was exposed to boiling acetone for 3 hours without being dissolved, softened or otherwise affected.

*Example 3*

A composition containing 75 parts of Polyether B, 25 parts of AOB, 1.5 parts of phosphoric acid dissolved in about 300 parts of equal weights of Cellosolve acetate and toluene was prepared. A sheet of cold rolled steel was dipped in the coating composition, the solvent allowed to evaporate from the coating and the film cured by baking for 30 minutes in an air oven at 350° F. The cured film on the sheet was then suspended in boiling 20% aqueous sodium hydroxide solution and periodic inspection of the film was made. The film was unaffected after 16 hours contact with the boiling caustic and showed no more than a slight loss of gloss after 22 hours contact when the test was terminated.

*Example 4*

Compositions were prepared having 75 parts each of Polyether A, B and C with 25 parts of AOB, 1.5 parts of phosphoric acid dissolved in about 300 parts of solvent consisting of equal parts of Cellosolve acetate and toluene. A series of films was prepared by flowing the compositions on tin-plated sheet steel panels and subjecting the coated panels to baking at temperatures from 300° F. to 400° F. for periods of 60 minutes to 5 minutes in order to determine the minimum time and temperature combinations which gave films which were fully cured as evidenced by being resistant and unaffected on contact for 5 minutes with methyl ethyl ketone as well as being flexible. The flexibility was determined by bending the panels 180° over a one-eighth inch mandrel and the films were considered flexible if no cracking or other sign of failure appeared at the bend. The results of the tests showed that the following minimum time and temperature combinations were needed for complete cure.

| Polyether in Composition | Minimum Time at— | | |
|---|---|---|---|
| | 300° F. | 350° F. | 400° F. |
| | Min. | Min. | Min. |
| A | 60 | 40 | 20 |
| B | 60 | 30 | 10 |
| C | 20 | 10 | 5 |

*Example 5*

Compositions of the invention deposited as films from solution and cured by baking in the presence of an acidic curing agent are subject to some crawling which is objectionable in certain applications. This phenomenon is overcome by incorporating polyvinyl butyral in the composition, as described and claimed in said Patent No. 2,713,565, hereinabove mentioned. Compositions in solution of equal parts of Cellosolve acetate and toluene were prepared containing 75 parts of Polyether B, 25 parts of AOB, 1.5 parts of phosphoric acid and the number of parts of polyvinyl butyral (Butvar B-76) indicated in the tabulation below. The solutions were flowed out on plate glass panels and curing was effected by baking for 20 minutes at 375° F. The baked films were examined for crawling with the following results.

| Parts of polyvinyl butyral | Crawling |
|---|---|
| 0.5 | Very slight. |
| 1.0 | None. |
| 1.5 | Do. |
| 2.0 | Do. |

*Example 6*

The presence of the polyvinyl butyral does not adversely affect the caustic resistance of cured films. A solution was prepared containing 73.1 parts of Polyether B, 24.4 parts of AOB, 1.5 parts of phosphoric acid and 1.0 part of polyvinyl butyral (Butvar B-76) dissolved in 77.5 parts of Cellosolve acetate, 77.5 parts of methyl isobutyl ketone, 47.2 parts of methyl isobutyl carbinol, and 22.5 parts of n-butanol. The formulation was applied to a 16-gauge cold rolled steel panel by dipping, six successive coatings being applied with curing by baking for 15 minutes at 300° F. for the first five coats and curing for one hour at 350° F. for the last. The coated panel was then immersed for 16 hours in boiling 20% aqueous sodium hydroxide solution. Inspection of the cured film showed it to be unaffected by this treatment.

*Example 7*

A pigmented coating composition was prepared by grinding 23% by weight of chromium oxide pigment and 73% by weight of vehicle in solution of organic solvent, the vehicle consisting of 73.1 parts of Polyether B, 24.4 parts of AOB, 1.0 part of polyvinyl butyral (Butvar B–76), and 1.5 parts of phosphoric acid. The composition was flowed out on tin-plated sheet-steel panels and cured by baking for 60 to 10 minutes at 300° F. to 400° F. as indicated in the table below. The panels were subjected to the following tests: (1) Impact Resistance with the Gardner Impact Tester at 28 inch pounds impact, (2) Flexibility by bending 180° over a one-eighth inch mandrel, and (3) MEK Resistance by contacting for 5 minutes with methyl ethyl ketone. The results are tabulated as follows with the key to the letter designations being given under the table.

| Baking Temp., °F. | Baking Time, Min. | Impact Resistance | Flexibility | MEK Resistance |
|---|---|---|---|---|
| 300 | 15 | HLC | HLC | SG |
| 300 | 30 | U | U | SS |
| 300 | 60 | U | U | U |
| 350 | 20 | U | U | SS |
| 350 | 40 | U | U | U |
| 350 | 60 | U | U | U |
| 400 | 10 | U | U | U |
| 400 | 20 | U | U | U |
| 400 | 30 | U | U | U |

Key: HLC—hairline cracks; SG—soft gel; SS—slightly softened; U—unaffected.

The glycidyl polyethers of polyhydric phenols referred to herein are condensates of polyhydric phenols with epichlorhydrin. Particularly when derived from dihydric phenols, these materials are known as "ethoxyline" resins. See Chemical Week, vol. 69, page 27, for September 8, 1951.

We claim as our invention:

1. A composition comprising a mixture of glycidyl polyether of a polyhydric phenol having a 1,2-epoxy equivalency greater than 1.0, and a 2-alkenyloxybenzene containing 1 to 3 methylol groups linked singly at the 2, 4 and 6 positions on the benzene ring.

2. A composition comprising glycidyl polyether of a polyhydric phenol having a 1,2-epoxy equivalency greater than 1.0 in uniform combination with a mixture of 2-alkenyloxybenzenes having 1 to 3 methylol groups which are linked singly at the 2, 4 and 6 positions on the benzene ring, which mixture contains a major proportion of the 2-alkenyloxybenzene having 3 methylol groups linked to the benzene ring.

3. A composition comprising glycidyl polyether of a dihydric phenol having a 1,2-epoxy equivalency greater than 1.0 in uniform combination with a mixture of 2-alkenyloxybenzenes having 1 to 3 methylol groups which are linked singly at the 2, 4 and 6 positions on the benzene ring, which mixture contains a major proportion of the 2-alkenyloxybenzene having 3 methylol groups linked to the benzene ring.

4. A composition comprising glycidyl polyether of a dihydric phenol having a 1,2-epoxy equivalency between 1.0 and 2.0 in admixture with a minor proportion of allyloxybenzene containing 1 to 3 methylol groups linked singly at the 2, 4 and 6 positions of the benzene ring.

5. A composition as defined in claim 4 wherein the dihydric phenol is 2,2-bis(4-hydroxyphenyl)propane, and the molecular weight of the polyether is about 1200 to 4000.

6. A composition comprising glycidyl polyether of a dihydric phenol having a 1,2-epoxy equivalency between 1.0 and 2.0 in uniform combination with a mixture of allyloxybenzenes containing 1 to 3 methylol groups linked singly at the 2, 4 and 6 positions on the benzene ring, which mixture contains a major proportion of the allyloxybenzene having 3 methylol groups linked to the benzene ring, and which composition contains about 20 to 45% by weight of said mixture.

7. A composition as defined in claim 6 wherein the dihydric phenol is 2,2-bis(4-hydroxyphenyl)propane, and the molecular weight of the polyether is about 1200 to 4000.

8. A composition comprising a mixture of (1) an epoxide resin, which is a condensate of epichlorohydrin and a dihydric phenol, and (2) an alkenyloxybenzene from the group consisting of allyloxybenzene and methylallyloxybenzene, said alkenyloxy benzene containing three methylol groups linked singly at the 2, 4 and 6 positions on the benzene ring, in proportions of 1 to 9 parts by weight of (1) to 9 to 1 parts by weight of (2).

9. A composition comprising a mixture of (1) an epoxide resin, which is a condensate of epichlorohydrin and a dihydric phenol, (2) an alkenyloxybenzene from the group consisting of allyloxybenzene and methallyloxybenzene, said alkenyloxybenzene containing 3 methylol groups linked singly at the 2, 4 and 6 positions on the benzene ring, in proportions of 1 to 9 parts of (1) to 9 to 1 parts by weight of (2), and (3) phosphoric acid in an amount of from 0.2% to 5% by weight based on the total composition as a curing catalyst.

10. A composition as defined in claim 9 wherein the dihydric phenol is 2,2-bis(4-hydroxyphenyl)propane, the alkenyloxybenzene is allyloxybenzene, and the amount of phosphoric acid is from about 1% to 2%.

References Cited in the file of this patent

UNITED STATES PATENTS

| 2,579,329 | Martin | Dec. 18, 1951 |
| 2,606,935 | Martin | Aug. 12, 1952 |

OTHER REFERENCES

Shell: article in Paint, Oil, and Chemical Review, Nov. 9, 1950, pages 15–18, 48 and 49.